United States Patent
Yoshimitsu

(10) Patent No.: US 9,208,953 B2
(45) Date of Patent: Dec. 8, 2015

(54) SOLID ELECTROLYTE CAPACITOR

(75) Inventor: Satoru Yoshimitsu, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 317 days.

(21) Appl. No.: 14/006,306

(22) PCT Filed: Mar. 8, 2012

(86) PCT No.: PCT/JP2012/055908
§ 371 (c)(1),
(2), (4) Date: Sep. 19, 2013

(87) PCT Pub. No.: WO2012/128052
PCT Pub. Date: Sep. 27, 2012

(65) Prior Publication Data
US 2014/0009870 A1   Jan. 9, 2014

(30) Foreign Application Priority Data

Mar. 23, 2011 (JP) .................................. 2011-064430

(51) Int. Cl.
*H01G 9/00* (2006.01)
*H01G 9/02* (2006.01)
(Continued)

(52) U.S. Cl.
CPC . *H01G 9/028* (2013.01); *H01G 9/15* (2013.01)

(58) Field of Classification Search
CPC ....... H01G 9/0036; H01G 9/15; H01G 9/012; H01G 9/025
USPC .................................. 361/523, 525; 252/62.2
See application file for complete search history.

(56) References Cited

U.S. PATENT DOCUMENTS

2004/0085711 A1   5/2004   Merker et al.
(Continued)

FOREIGN PATENT DOCUMENTS

EP    1391474 A1    2/2004
(Continued)

OTHER PUBLICATIONS

International Search Report issued in International Application No. PCT/JP2012/055908 mailed May 15, 2012.

*Primary Examiner* — Eric Thomas
*Assistant Examiner* — Arun Ramaswamy
(74) *Attorney, Agent, or Firm* — McDermott Will & Emery LLP

(57) ABSTRACT

To provide a solid electrolytic capacitor capable of high performance, the capacitor including: an anode element having a dielectric film disposed on a surface thereof; a cathode element; and a solid electrolyte interposed between the anode element and the cathode element, the solid electrolyte being a conductive polymer having a first repeat unit (A) expressed by the following formula (1) and a second repeat unit (B) expressed by the following formula (2):

[Chem. 1]

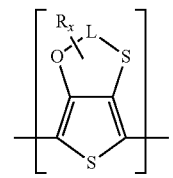

(1)

[Chem. 2]

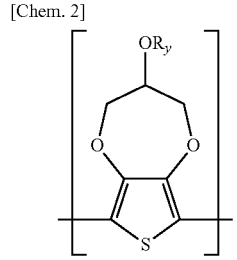

(2)

where L is an arbitrarily replaceable alkylene or silyl group having 2 or 3 carbon atoms; and Rx and Ry are each arbitrarily replaceable alkyl groups having a linear or branched structure and having 1 to 14 carbon atoms, each being different from the other

5 Claims, 2 Drawing Sheets .

(51) Int. Cl.
*H01G 9/028* (2006.01)
*H01G 9/15* (2006.01)

(56) References Cited

U.S. PATENT DOCUMENTS

2005/0013094 A1  1/2005  Reuter et al.
2005/0111165 A1  5/2005  Merker et al.

FOREIGN PATENT DOCUMENTS

| EP | 1498920 A2 | 1/2005 |
| EP | 1524678 A2 | 4/2005 |
| JP | 2004-096098 A | 3/2004 |
| JP | 2005-039276 A | 2/2005 |
| JP | 2005-123630 A | 5/2005 |
| JP | 2009-059831 A | 3/2009 |

F I G. 3
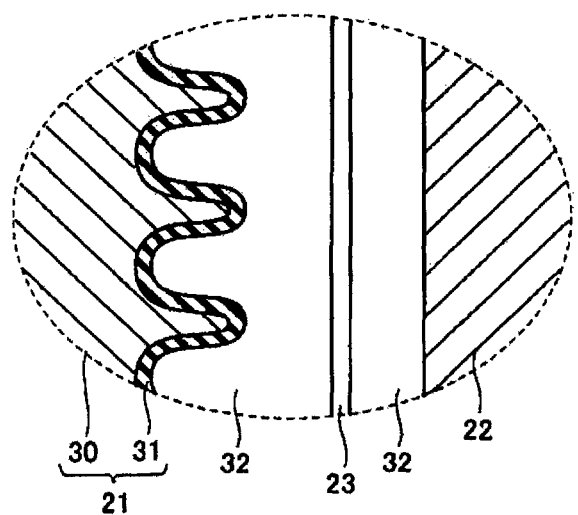

SOLID ELECTROLYTE CAPACITOR

RELATED APPLICATIONS

This application is the U.S. National Phase under 35 U.S.C. §371 of International Application No. PCT/JP2012/055908, filed on Mar. 8, 2012, which in turn claims the benefit of Japanese Application No. 2011-064430, filed on Mar. 23, 2011, the disclosures of which Applications are incorporated by reference herein.

TECHNICAL FIELD

The present invention relates to a solid electrolytic capacitor, particularly, to a solid electrolytic capacitor including a solid electrolyte comprising a conductive polymer.

BACKGROUND ART

Conventionally, various capacitors have been developed in an attempt to reduce size and increase capacity. Among them, solid electrolytic capacitors are widely known as capacitors fit for size reduction. One kind of a solid electrolytic capacitor includes an anode element comprising: a sintered element comprising a valve metal, examples thereof including niobium, tantalum, and aluminum; or a foil comprising such valve metal and having a surface roughened by etching or the like. Such a solid electrolytic capacitor has an anode element with a large surface area, and therefore has a dielectric film of a wider area. As a result, size reduction and capacity increase are made possible.

In particular, a solid electrolytic capacitor including a solid electrolyte comprising a conductive polymer has a small size, large capacity, low equivalent series resistance (hereafter, "ESR"), and furthermore, excellent features such as being suited for surface mounting. Thus, a solid electrolytic capacitor including a solid electrolyte comprising a conductive polymer is an indispensable element for realizing smaller size, higher performance, and lower production cost for electronic devices.

In an attempt to meet the requirement of size reduction in electronic devices, development efforts are underway to further improve the features of the foregoing solid electrolytic capacitor. For example, Patent Literatures 1 and 2 disclose materials made of a conductive polymer capable of improving performance of a solid electrolytic capacitor, such as conductivity and ESR.

CITATION LIST

Patent Literatures

[Patent Literature 1] Japanese Laid-Open Patent Publication No. 2004-96098
[Patent Literature 2] Japanese Laid-Open Patent Publication No. 2005-123630

SUMMARY OF INVENTION

Technical Problem

However, there are still demands for further improvement in solid electrolytic capacitors. Thus, to meet such demands, it is necessary to provide a solid electrolytic capacitor capable of higher performance.

Therefore, an object of the present invention is to provide a solid electrolytic capacitor capable of high performance.

Solution to Problem

The present invention relates to a solid electrolytic capacitor comprising: an anode element having a dielectric film disposed on a surface thereof; a cathode element; and a solid electrolyte interposed between the anode element and the cathode element, the solid electrolyte being a conductive polymer having a first repeat unit (A) expressed by the following formula (1) and a second repeat unit (B) expressed by the following formula (2).

[Chem. 1]

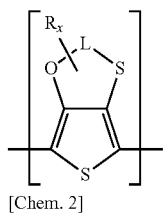

(1)

[Chem. 2]

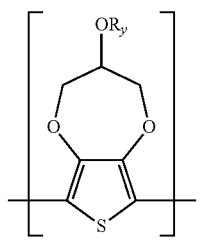

(2)

In the chemical formulae (1) and (2), L is an arbitrarily replaceable alkylene or silyl group having 2 or 3 carbon atoms; and $R_x$ and $R_y$ are each arbitrarily replaceable alkyl groups having a linear or branched structure and having 1 to 14 carbon atoms, each being different from the other.

In the conductive polymer in the solid electrolytic capacitor, a ratio (A:B) of a weight of the first repeat unit (A) to a weight of the second repeat unit (B), is preferably 1:1 to 9:1.

In the conductive polymer in the solid electrolytic capacitor, the ratio (A:B) of the weight of the first repeat unit (A) to the weight of the second repeat unit (B), is preferably 3:2 or more.

In the conductive polymer in the solid electrolytic capacitor, the ratio (A:B) of the weight of the first repeat unit (A) to the weight of the second repeat unit (B), is preferably 7:3 or less.

In the solid electrolytic capacitor, the first repeat unit (A) preferably has a structure expressed by the following formula (3), and the second repeat unit (B) preferably has a structure expressed by the following formula (4).

[Chem. 3]

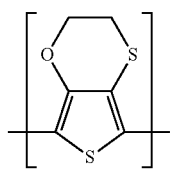

(3)

[Chem. 4]

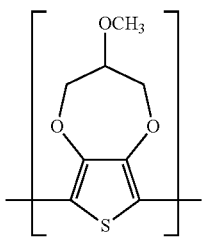

(4)

Advantageous Effects of Invention

According to the present invention, it is possible to provide a solid electrolytic capacitor with a low ESR, and thus, to provide a method for producing a solid electrolytic capacitor capable of high performance.

BRIEF DESCRIPTION OF DRAWINGS

FIG. 3 is a schematic vertical sectional view of an assembly comprising an anode element, a cathode element, and a part therebetween, to explain the structure of the part therebetween.

DESCRIPTION ON EMBODIMENT

Figure 1:
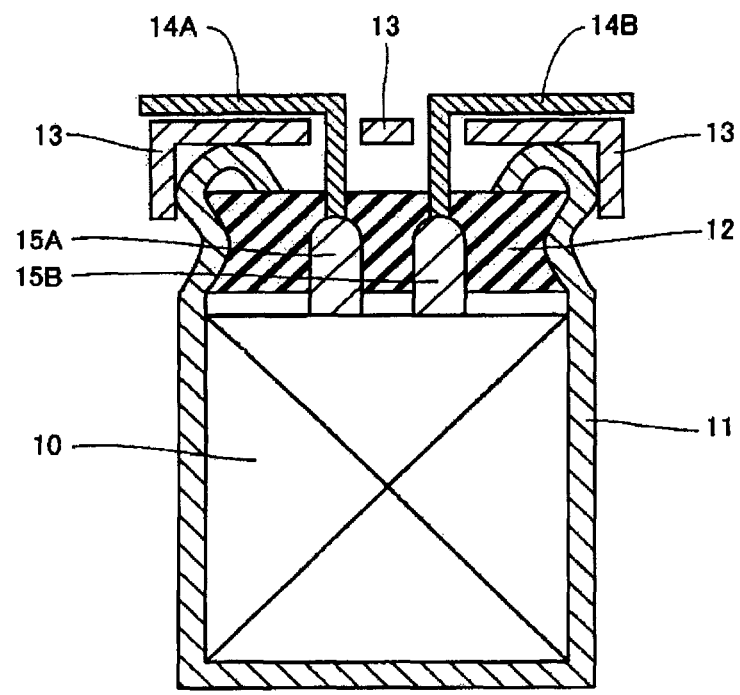
FIG. 1 is a schematic vertical sectional view of a solid electrolytic capacitor according to one embodiment.

In the following, a description will be given on an embodiment of a method for producing a solid electrolytic capacitor according to the present invention, with reference to drawings. The following embodiment is merely an example, and various embodiments are possible within the scope of the present invention. In the drawings of the present invention, like reference numerals shall denote like parts or corresponding parts.

First, by using FIGS. 1 to 3, a description will be given on the structure of a solid electrolytic capacitor 100 according to the present embodiment.

In FIG. 1, the solid electrolytic capacitor 100 comprises: a capacitor element 10; a bottom-closed case 11; a sealing member 12; a seat plate 13; lead wires 14A and 14B; and lead tabs 15A and 15B. The lead tabs 15A and 15B are connected to the capacitor element 10. The lead wires 14A and 14B are electrically connected to the lead tabs 15A and 15B, respectively. The capacitor element 10 is housed in the bottom-closed case 11 having an opening at an upper end of the case; and is sealed therein, by arranging the sealing member 12 on an upper surface of the capacitor element 10. The sealing member 12 is formed such that the lead wires 14A and 14B penetrate therethrough. An end portion near the opening of the bottom-closed case 11 is twisted and curled, and the seat plate 13 is arranged on the curled portion.

Figure 2:
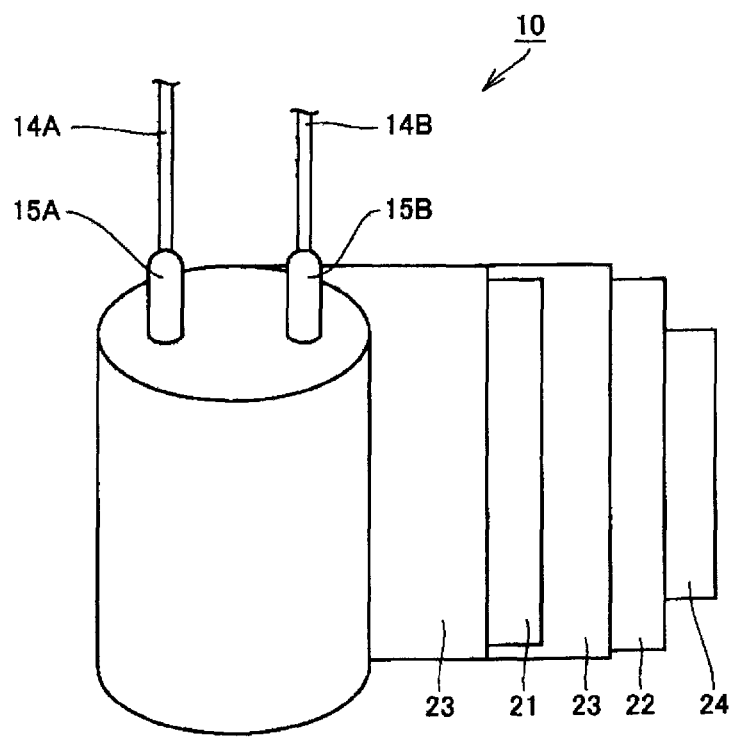
FIG. 2 is a schematic drawing of the solid electrolytic capacitor of FIG. 1, to explain the structure thereof.

In FIG. 2, the capacitor element 10 comprises: an anode element 21 connected to the lead tab 15A; a cathode element 22 connected to the lead tab 15B; and a separator 23. The anode element 21 and the cathode element 22 are wound together, with the separator 23 interposed therebetween. An outermost surface of the wound assembly is fastened with a fastening tape 24. Note that FIG. 2 illustrates the wound assembly in a state before the outermost surface is fastened.

As illustrated in FIG. 3, the anode element 21 comprises: a metal foil 30 having a roughened surface; and a dielectric film 31 disposed on the roughened surface of the metal foil 30. A solid electrolyte 32 is interposed between the anode element 21 and the cathode element 22, and also permeates the separator 23.

Next, by using FIGS. 1 to 3, a detailed description will be given on each component of the solid electrolytic capacitor 100.

Regarding the anode element 21, material for the metal foil 30 is not particularly limited, and examples thereof include valve metals such as tantalum, niobium, and aluminum. The surface of the metal foil 30 can be roughened, for example, by etching. The dielectric film 31 can be formed, for example, by chemically converting the surface of the metal foil 30. The dielectric film 31 can also be formed by stacking materials of the film on the metal foil 30.

The cathode element 22 comprises a metal foil, and material therefor is not particularly limited. Examples of such material include valve metals such as tantalum, niobium, and aluminum. The anode element 21 and the cathode element 22 may be made of the same metal or different metals.

Material for the separator 23 is not particularly limited, and examples thereof include non-woven fabrics mainly composed of synthetic cellulose, polyethylene terephthalate, vinylon, and aramid fiber.

The solid electrolyte 32 is a conductive polymer having a first repeat unit (A) of the formula (1) below and a second repeat unit (B) of the formula (2) below. L is an arbitrarily replaceable alkylene or silyl group having 2 or 3 carbon atoms; and $R_x$ and $R_y$ are arbitrarily replaceable alkyl groups having a linear or branched structure and having 1 to 14 carbon atoms, each being different from the other. That is, the solid electrolyte 32 has a composition in which a dopant is added to a polymer which is a copolymer having the first repeat unit (A) and the second repeat unit (B).

[Chem. 5]

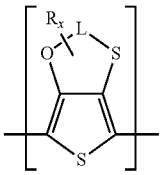

(1)

[Chem. 6]

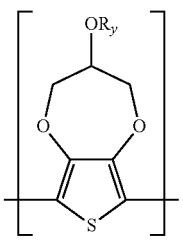

(2)

Typically, when a polymer for forming a solid electrolyte is a copolymer having a first repeat unit and a second repeat unit, properties of a solid electrolyte comprising such a copolymer (hereafter, "solid copolymer electrolyte") are somewhere in between those of a solid electrolyte comprising a polymer having only the first repeat unit (hereafter, "first solid electrolyte") and those of a solid electrolyte comprising a polymer having only the second repeat unit (hereafter, "second solid electrolyte").

For example, when a solid electrolytic capacitor including the first solid electrolyte has an ESR of 2×R (mΩ) (here, R is a positive number), and a solid electrolytic capacitor including the second solid electrolyte has an ESR of R (mΩ), usually, a solid electrolytic capacitor including the solid copolymer electrolyte has an ESR lower than 2R. As such, characteristics of a solid electrolytic capacitor including the solid copolymer electrolyte as a solid electrolyte, are presumably somewhere in between those of a solid electrolytic capacitor including the first solid electrolyte and those of a solid electrolytic capacitor including the second solid electrolyte.

In contrast, the present inventors found that ESR of the solid electrolytic capacitor including the solid electrolyte having the first repeat unit (A) of the formula (1) and the second repeat unit (B) of the formula (2), was better than those of a solid electrolytic capacitor including only the first repeating unit (A) and those of a solid electrolytic capacitor including only the second repeating unit (B). Here, the solid electrolyte being better in ESR means that it has a lower initial ESR value.

In particular, L in the formula (1) is preferably an alkylene group having 2 or 3 carbon atoms. In the formula (1), as long as $R_x$ is an arbitrarily replaceable alkyl group having a linear or branched structure and having 1 to 14 carbon atoms in which x is 1 to 14, all of the first repeat units (A) will share the same chemical properties. The same applies to $R_y$ in the formula (2).

In particular, a skeleton of 3,4-ethyleneoxythiathiophene expressed by the following formula (3) is preferably used for the first repeat unit (A); and a skeleton of 3-methoxy-3,4-butylenedioxythiophene expressed by the following formula (4) is preferably used for the second repeat unit (B).

[Chem. 7]

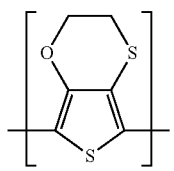

(3)

[Chem. 8]

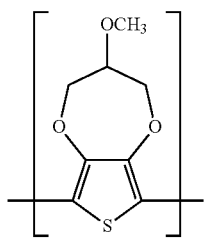

(4)

The dopant is not particularly limited, and may be a sulfonate compound or the like having one or more alkyl or alkoxyl groups having 1 to 18 carbon atoms, and one or more sulfone groups. Examples of the sulfonate compound include an alkyl sulfonate compound, an aromatic sulfonate compound, and a polycyclic aromatic sulfonate compound. Among these, p-toluenesulfonate compounds and methoxy-benzenesulfonate compounds are preferred, in terms of their ability to give high conductivity to polymers. The dopant is able to function when it is ionized in the solid electrolyte 32.

The present inventors also found that a solid electrolytic capacitor with lower ESR and sufficient capacitance is obtained, when the ratio (A:B) of the weight of the first repeat unit (A) and the weight of the second repeat unit (B) is 1:1 to 9:1. They also found that ESR of the solid electrolytic capacitor 100 is much lower when the ratio (A:B) is 3:2 to 9:1. Furthermore, they found that the solid electrolytic capacitor 100 has high heat resistance, in addition to the above-described properties, when the ratio (A:B) is 3:2 to 7:3.

Here, the fact that the solid electrolyte 32 includes the first repeat unit (A) and the second repeat unit (B) can be confirmed by, for example, taking out a part of the solid electrolyte 32 from the solid electrolytic capacitor 100, and subjecting the part to X-ray structural analysis. The ratio of the weight of the first repeat unit (A) and the weight of the second repeat unit (B) can be calculated from a molecular ratio of A to B that is calculated from the results of the X-ray structural analysis.

The bottom-closed case 11 is not particularly limited, and can be a case made of a metal, i.e., aluminum, stainless steel, copper, iron, brass, or the like, or of an alloy of the foregoing metals. The sealing member 12 is not particularly limited as long as it is of an insulating material, examples thereof including elastic insulating elements, particularly insulating rubbers such as silicone rubber, fluoro rubber, ethylene propylene rubber, Hypalon rubber, butyl rubber, and isoprene rubber that are comparatively high in heat resistance and sealing performance. The lead wires 14A and 14B and the lead tabs 15A and 15B are not particularly limited as long as they are conductive, and any known material can be used.

The solid electrolytic capacitor 100 in the present embodiment can be produced, for example, by the following production method.

First, a metal foil 30 made of a valve metal is prepared. Then, a surface of the metal foil 30 is etched for roughening. Next, the roughened surface of the metal foil 30 is chemically converted, thereby to form a dielectric film 31 thereon. Thus, an anode element 21 is made.

Next, the anode element 21 and a cathode element 22 are wound with a separator 23 interposed therebetween. At that time, the lead tabs 15A and 15B are also wound in, thereby enabling the lead tabs 15A and 15B to be embedded in a standing position, in the resultant wound assembly. The wound assembly corresponds to the structure of a capacitor element 10 before a solid electrolyte 32 is formed.

Then, an outermost layer of the wound assembly is fastened with a fastening tape 24, thereby to complete production of the wound assembly. When the anode element 21 is prepared by cutting a large-sized metal foil, the wound assembly may be subjected to further chemical conversion treatment, so that a dielectric film would be formed on a cut surface of the anode element 21.

Next, a solid electrolyte 32 is formed between the anode element 21 and the cathode element 22. Specifically, first, a monomer mixture containing a monomer of a first repeat unit (A) (hereafter, "monomer A") and a monomer of a second repeat unit (B) (hereafter, "monomer B"), and a dopant solution containing a dopant, are prepared.

Here, the following two matches with each other: a weight ratio of the first repeat unit (A) to the second repeat unit (B) in a conductive polymer, i.e., a copolymer formed by a polymerization reaction; and a weight ratio of the monomer A to the monomer B in the monomer mixture used in the polymerization reaction. Therefore, proportions of the monomers A and B to be mixed are adjusted, such that the following two would match with each other: the weight ratio of the monomer A to the monomer B in the monomer mixture; and the intended weight ratio of the first repeat unit (A) to the second repeat unit (B) in the solid electrolytic capacitor.

For example, when forming the solid electrolyte 32 in which the weight ratio of the first repeat unit (A) expressed by the formula (3) and the second repeat unit (B) expressed by the formula (4), is 1:1, the monomers A and B may be mixed, such that a weight ratio of 3,4-ethyleneoxythiathiophene (monomer A) expressed by the following formula (5) to 3-methoxy-3,4-butylenedioxythiophene (monomer B) expressed by the following formula (6), is 1:1.

[Chem. 9]

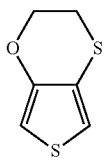

(5)

[Chem. 10]

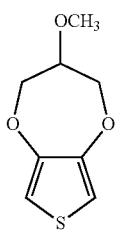

(6)

The dopant contained in the dopant solution is preferably a sulfonate compound, e.g., a metal sulfonate salt. Sulfonate ions derived from a metal sulfonate salt can function as a dopant in a copolymer, whereas metal ions derived from a metal sulfonate salt can function as an oxidant for accelerating a polymerization reaction. In particular, iron (III) tris-p-toluenesulfonate and iron (III) tris-methoxybenzenesulfonate are preferable, due to their ability to function well as both a dopant and an oxidant.

The dopant concentration in the dopant solution is preferably 40 percent by weight to 65 percent by weight, and particularly preferably 50 percent by weight to 60 percent by weight, in terms of lowering ESR and stabilizing the dopant solution. A solvent for the dopant solution is not particularly limited, but is preferably a volatile solvent due to its easy removal. Examples of such a volatile solvent include a hydrocarbon solvent such as pentane, an ether solvent such as tetrahydrofuran, an ester solvent such as ethyl formate, a ketone solvent such as acetone, an alcohol solvent such as methanol, and a nitrogen-containing organic solvent such as acetonitrile. Preferred among these is the alcohol solvent which is industrially available at low cost and safe in working environments; and particularly preferred is ethanol.

Next, the monomer mixture and the dopant solution prepared are mixed, thereby to prepare a liquid for polymerization. Proportions of the monomer mixture and the dopant solution are preferably 3:1 to 5:1, in terms of increasing capacitance and lowering ESR.

Then, the wound assembly is immersed in the liquid for polymerization prepared, so that it becomes impregnated with the liquid; and thereafter, it is taken out of the liquid. This causes a polymerization reaction between the monomer A and the monomer B, in the liquid inside the wound assembly through the impregnation. As a result, a solid electrolyte 32 is formed. Note that the present embodiment is merely one embodiment. For example, the wound assembly may be immersed in the monomer mixture and the dopant, separately. Moreover, although the above method is for forming the solid electrolyte 32 by chemical polymerization, the solid electrolyte 32 may also be formed by electrolytic polymerization.

By the foregoing process, a capacitor element 10 is produced. Then, the capacitor element 10 is placed in a bottom-closed case 11, such that lead wires 14A and 14B are positioned at an upper end of the case where there is an opening. Next, a sealing member 12, formed such that the lead wires 14A and 14B penetrate therethrough, is arranged on an upper side of the capacitor element 10, thereby to seal the element in the case. Next, an end portion near the opening of the case is twisted and curled, and a seat plate 13 is arranged on the curled portion, thereby to produce a solid electrolytic capacitor 100 as illustrated in FIG. 1.

In the present embodiment, the solid electrolytic capacitor 100 includes the solid electrolyte 32 having the first repeat unit (A) of the formula (1) and the second repeat unit (B) of the formula (2). Therefore, in the solid electrolytic capacitor 100, ESR is excellent, and other properties such as capacitance are also sufficiently high. Therefore, according to the present invention, it is possible to lower the ESR value, while also making properties other than ESR such as capacitance be of an intermediate level. As a result, it is possible to produce a solid electrolytic capacitor with high performance.

In the foregoing, a description was given on the present invention by using the wound-type solid electrolytic capacitor 100 illustrated in FIG. 1. However, the solid electrolytic capacitor of the present invention is not limited to the above, and may be, for example, a solid electrolytic capacitor having a structure in which a solid electrolyte is disposed on an anode element which is a sintered element, or a solid electrolytic capacitor that is a single layer-type or a stacked-type comprising an anode element made of a metal plate having a solid electrolyte thereon.

EXAMPLES

In the following, the present invention will be described in more detail with reference to Examples. However, it should be noted that the present invention is not limited to these Examples.

Example 1

First, an aluminum foil was subjected to etching so that a surface thereof would be roughened. Thereafter, the surface of the aluminum foil was chemically converted to form thereon a dielectric film. The chemical conversion treatment was performed by immersing the aluminum foil into an aqueous solution containing 2 percent by weight of ammonium adipate, and then applying a voltage of 5 V to the aluminum foil. Then, the aluminum foil was cut to obtain an anode element.

Next, a cathode element including an aluminum foil and a separator were prepared. An anode lead tab was arranged on a surface of the anode element, and a cathode lead tab was arranged on a surface of the cathode element. Then, the anode element, the cathode element, and the separator were wound together, such that the anode lead tab and the cathode lead tab are wound in the resultant. Then, an outermost surface of the resultant was taped with a fastening tape, thereby to produce a wound element. A surface of a cut end of the wound element produced (i.e., cut end of the anode element) was chemically converted in the same manner as in the foregoing.

Next, the wound element produced was immersed in a liquid for polymerization prepared such that a ratio A:B of the weight of a monomer A to the weight of a monomer B in the liquid, was 9:1. Thereafter, the wound element was taken out of the liquid and heated, thereby to form a solid electrolyte inside the wound element. The liquid for polymerization was prepared in the following manner.

First, an ethanol solution containing iron (III) tris-p-toluenesulfonate at a concentration of 57 percent by weight, was prepared. Also, two compounds, i.e., the monomer A being 3,4-ethyleneoxythiathiophene expressed by the formula (5), and the monomer B being 3-methoxy-3,4-butylenedioxythiophene expressed by the formula (6), were mixed, such that a weight ratio of the monomer A to the monomer B was 9:1. Thus, 50 mg of a monomer mixture was prepared. Then, the monomer mixture was added to the ethanol solution, such that a ratio of the weight of the mixture relative to the weight of the solution was 1:3. Thus, 200 mg of the liquid for polymerization was prepared. Due to the above, the ratio (A:B) of the weight of the monomer A to the weight of the monomer B, was 9:1.

By the foregoing process, the solid electrolyte having a polymer, i.e., a copolymer of the monomer A and the monomer B, was formed. That is, the solid electrolyte includes a first repeat unit expressed by the formula (3) and a second repeat unit expressed by the formula (4).

Next, the capacitor element produced was placed in a bottom-closed case, such that lead wires were positioned at an upper side of the case where there was an opening. Next, a rubber seal, i.e., a sealing member formed such that the lead wires penetrate therethrough, was arranged on an upper side of the capacitor element, thereby to seal the capacitor element in the case. Thereafter, an end portion near the opening of the case was twisted and then curled, and a seat plate was arranged on the curled portion. Finally, the resultant was aged, and thus a wound-type solid electrolytic capacitor was produced.

Example 2

A solid electrolytic capacitor was produced in the same manner as Example 1, except for the ratio (A:B) of the weight of the monomer A to the weight of the monomer B in the liquid for polymerization used, being 4:1.

Example 3

A solid electrolytic capacitor was produced in the same manner as Example 1, except for the ratio (A:B) of the weight of the monomer A to the weight of the monomer B in the liquid for polymerization used, being 7:3.

Example 4

A solid electrolytic capacitor was produced in the same manner as Example 1, except for the ratio (A:B) of the weight of the monomer A to the weight of the monomer B in the liquid for polymerization used, being 3:2.

Example 5

A solid electrolytic capacitor was produced in the same manner as Example 1, except for the ratio (A:B) of the weight of the monomer A to the weight of the monomer B in the liquid for polymerization used, being 1:1.

Comparative Example 1

A solid electrolytic capacitor was produced in the same manner as Example 1, except for preparing the 200 mg of the liquid for polymerization without using the monomer B, by adding the monomer A to the ethanol solution such that a ratio of the weight of the monomer A to the weight of the ethanol solution was 1:3.

Comparative Example 2

A solid electrolytic capacitor was produced in the same manner as Example 1, except for preparing the 200 mg of the liquid for polymerization without using the monomer A, by adding the monomer B to the ethanol solution such that a ratio of the weight of the monomer B to the weight of the ethanol solution was 1:3.

For the solid electrolytic capacitor of each of Examples 1 to 5 and Comparative Examples 1 and 2, 100 pieces were produced. All of the solid electrolytic capacitors produced had the same outside dimensions of 8 mm in diameter and 12 mm in height. The solid electrolytic capacitors also had the same rated voltage of 35 RV and the same rated capacity of 22 µF.

[Initial Characteristics: ESR and Initial Capacitance]

Twenty pieces were randomly picked out from the 100 pieces of the solid electrolytic capacitors produced for each of the Examples and Comparative Examples, and were measured for initial ESR (mΩ) at a frequency of 100 kHz, by using a LCR meter for four-terminal measurements. The average of the obtained values for each is shown in Table 1.

Moreover, the twenty pieces picked out for each of the Examples and Comparative Examples, were measured for initial capacitance (µF) at a frequency of 120 kHz, by using the LCR meter for four-terminal measurements. The average of the obtained values for each is shown in Table 2.

[Reflow Test]

A reflow test was performed on each of the solid electrolytic capacitors after the foregoing initial characteristics measurements. Specifically, the solid electrolytic capacitors for each of the Examples and Comparative Examples were left in an environment of 121° C. or higher and 2 atmospheres for 12 hours, for forced absorption of moisture. Thereafter, the solid electrolytic capacitors were kept at 230° C. or higher, with maximum temperature being 250° C., for 30 seconds.

[Characteristics after Test: ESR and Capacitance]

After the reflow test, each of the solid electrolytic capacitors was measured for ESR and capacitance, in the same manner as above. The average of the obtained values for each characteristic is shown in Tables 1 and 2.

[Rate of Change: ESR and Capacitance]

For each of the solid electrolytic capacitors, the rate of change in ESR (ΔR) was calculated by using the following calculation formula (1), where $R_0$ was the initial ESR and R was the ESR after the reflow test. The results are shown in Table 1.

$$\Delta R (\text{times}) = R/R_0 \tag{1}$$

Moreover, for each of the solid electrolytic capacitors, the rate of change in capacitance (ΔC) was calculated by using the following calculation formula (2), where $C_0$ was the initial capacitance and C was the capacitance after the reflow test. The results are shown in Table 2.

$$\Delta C (\%) = (C - C_0)/C_0 \times 100 \tag{2}$$

TABLE 1

|  | monomer | initial ESR (mΩ) | ESR after test (mΩ) | rate of change (times) |
| --- | --- | --- | --- | --- |
| Ex. 1 | A:B = 9:1 | 13.2 | 18.7 | 1.42 |
| Ex. 2 | A:B = 4:1 | 12.2 | 16.2 | 1.33 |
| Ex. 3 | A:B = 7:3 | 11.0 | 14.3 | 1.30 |
| Ex. 4 | A:B = 3:2 | 12.5 | 16.1 | 1.29 |
| Ex. 5 | A:B = 1:1 | 13.4 | 16.5 | 1.23 |
| Comp. Ex. 1 | A | 15.3 | 23.4 | 1.53 |
| Comp. Ex. 2 | B | 13.4 | 25.5 | 1.11 |

TABLE 2

|  | monomer | initial capacitance (µF) | capacitance after test (µF) | rate of change (%) |
| --- | --- | --- | --- | --- |
| Ex. 1 | A:B = 9:1 | 22.0 | 21.4 | −2.9 |
| Ex. 2 | A:B = 4:1 | 22.2 | 21.7 | −2.4 |
| Ex. 3 | A:B = 7:3 | 22.2 | 21.8 | −1.9 |
| Ex. 4 | A:B = 3:2 | 22.4 | 21.9 | −2.3 |
| Ex. 5 | A:B = 1:1 | 22.5 | 22.0 | −2.4 |
| Comp. Ex. 1 | A | 20.9 | 19.9 | −4.9 |
| Comp. Ex. 2 | B | 23.0 | 22.5 | −2.4 |

[Evaluation]

In view of Table 1, regarding Examples 1 to 5, the ESR value was equal to or higher than that of Comparative Example 2 which used only the monomer A. As described in the foregoing, typically, when a copolymer is produced with two kinds of monomers, the ESR value of a solid electrolytic capacitor having such a copolymer is presumably the intermediate value of the ESR values of two solid electrolytic capacitors separately produced with each of the two kinds of monomers. However, in the case of Examples 1 to 5, the results were to the contrary. Moreover, regarding Examples 1 to 5, it was found that despite the value for the rate of change in ESR being the intermediate value of those of Comparative Examples 1 and 2, the ESR characteristic was the same or better than that of Comparative Examples 1 and 2, whereas the ESR value was lower.

Therefore, from Table 1, it was found that a solid electrolytic capacitor having an excellent ESR characteristic was obtained by forming a solid electrolyte by copolymerizing the monomers A and B, instead of using these monomers separately. Particularly, as shown in Table 1, the ESR value was more lowered when the ratio A:B was 3:2 to 9:1, and much more lowered when the ratio A:B was 3:2 to 4:1.

In view of Table 2, regarding Examples 1 to 5, it was found that the initial capacitance value was between those of Comparative Examples 1 and 2, and became closer to that of Comparative Example 2 as the proportion by weight of the monomer B became larger. From the above, it was found that copolymerizing the monomers A and B caused the initial capacitance value of the solid electrolytic capacitor to be the intermediate value of the initial capacitance values of the solid electrolytic capacitor produced with only the monomer A and the solid electrolytic capacitor produced with only the monomer B.

As shown in Table 2, regarding Examples 2 to 5, it was found that despite the initial capacitance value being the intermediate value of those of Comparative Examples 1 and 2, the rate of change in capacitance was equal to or lower than those of Comparative Examples 1 and 2. From the above, it was found that according to Examples 2 to 5, the solid electrolytic capacitor was able to have a heat resistance same or better than that of the monomer A, despite the capacitor having therein a mixture of the monomer A, which is comparatively low in heat resistance, and the monomer B, which is comparatively high in heat resistance. Particularly, as shown in Table 2, the heat resistance was much more improved when the ratio A:B was 3:2 to 7:3.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present invention can be widely used for a method for producing a solid electrolytic capacitor, particularly that including a solid electrolyte comprising a conductive polymer.

REFERENCE SIGNS LIST 10 capacitor element
11 bottom-closed case
12 sealing member
13 seat plate
14A, 14B lead wire
15A, 15B lead tab
21 anode element
22 cathode element
23 separator
24 fastening tape
30 metal foil
31 dielectric film
32 solid electrolyte

The invention claimed is:

1. A solid electrolytic capacitor comprising:
an anode element having a dielectric film disposed on a surface thereof;
a cathode element; and
a solid electrolyte interposed between the anode element and the cathode element,
the solid electrolyte being a conductive polymer having a first repeat unit (A) expressed by the following formula (1) and a second repeat unit (B) expressed by the following formula (2):

[Chem. 1]

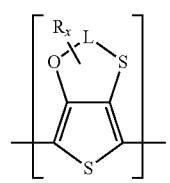

(1)

-continued

[Chem. 2]

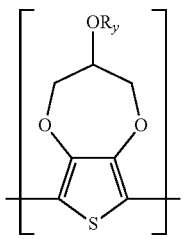
(2)

where L is an arbitrarily replaceable alkylene or silyl group having 2 or 3 carbon atoms; and $R_x$ and $R_y$ are each arbitrarily replaceable alkyl groups having a linear or branched structure and having 1 to 14 carbon atoms, each being different from the other.

2. The solid electrolytic capacitor in accordance with claim 1, wherein, in the conductive polymer, a ratio (A:B) of a weight of the first repeat unit (A) to a weight of the second repeat unit (B), is 1:1 to 9:1.

3. The solid electrolytic capacitor in accordance with claim 2, wherein, in the conductive polymer, the ratio (A:B) of the weight of the first repeat unit (A) to the weight of the second repeat unit (B), is 3:2 or more.

4. The solid electrolytic capacitor in accordance with claim 3, wherein, in the conductive polymer, the ratio (A:B) of the weight of the first repeat unit (A) to the weight of the second repeat unit (B), is 7:3 or less.

5. The solid electrolytic capacitor in accordance with claim 1, wherein the first repeat unit (A) has a structure expressed by the following formula (3), and the second repeat unit (B) has a structure expressed by the following formula (4):

[Chem. 3]

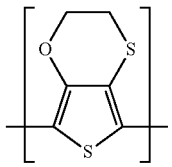
(3)

[Chem. 4]

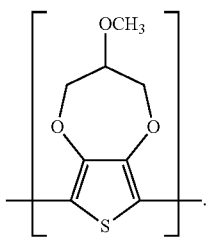
(4)

\* \* \* \* \*